(12) United States Patent
Keller et al.

(10) Patent No.: US 8,879,877 B2
(45) Date of Patent: Nov. 4, 2014

(54) FIBER OPTIC CABLE FOR CORDAGE OR TACTICAL APPLICATIONS

(75) Inventors: David Keller, Cary, NC (US); Christopher Raynor, Holly Springs, NC (US); Terry Gooch, Holly Springs, NC (US); Randie Yoder, Garner, NC (US); Dan Rouse, Apex, NC (US)

(73) Assignee: Nexans, Paris (FR)

( * ) Notice: Subject to any disclaimer, the term of this patent is extended or adjusted under 35 U.S.C. 154(b) by 565 days.

(21) Appl. No.: 12/791,458

(22) Filed: Jun. 1, 2010

(65) Prior Publication Data

US 2011/0293228 A1 Dec. 1, 2011

(51) Int. Cl.
*G02B 6/44* (2006.01)
*C03B 37/023* (2006.01)

(52) U.S. Cl.
CPC ............ *G02B 6/4486* (2013.01); *G02B 6/4432* (2013.01)
USPC .............. 385/107; 385/103; 385/104; 65/385

(58) Field of Classification Search
USPC ............ 385/103, 102, 104, 107; 65/385, 401, 65/483
See application file for complete search history.

(56) References Cited

U.S. PATENT DOCUMENTS

| | | | | |
|---|---|---|---|---|
| 4,365,865 A * | 12/1982 | Stiles | .............................. | 385/101 |
| 4,427,033 A * | 1/1984 | Ege | ................................ | 138/103 |
| 4,505,541 A * | 3/1985 | Considine et al. | ............. | 385/107 |
| 4,515,435 A * | 5/1985 | Anderson | ....................... | 385/103 |
| 4,552,433 A * | 11/1985 | Titchmarsh et al. | ........... | 385/107 |
| 4,675,475 A * | 6/1987 | Bortner et al. | .............. | 174/113 R |
| 4,696,542 A * | 9/1987 | Thompson | ..................... | 385/108 |
| 4,946,237 A * | 8/1990 | Arroyo et al. | .................. | 385/107 |
| 4,993,804 A * | 2/1991 | Mayr et al. | ..................... | 385/103 |
| 5,016,973 A * | 5/1991 | Hager et al. | ................... | 385/102 |
| 5,230,034 A * | 7/1993 | Bottoms et al. | ................ | 385/113 |
| 5,325,457 A * | 6/1994 | Bottoms et al. | ................ | 385/113 |
| 5,627,932 A * | 5/1997 | Kiel et al. | ....................... | 385/102 |
| 6,053,213 A * | 4/2000 | Jung et al. | ...................... | 138/130 |
| 6,233,384 B1 * | 5/2001 | Sowell et al. | ................... | 385/107 |
| 6,519,399 B2 * | 2/2003 | Strong et al. | ................... | 385/114 |
| 6,621,965 B2 * | 9/2003 | Seddon et al. | ................. | 385/111 |
| 6,674,946 B2 * | 1/2004 | Warden et al. | ................ | 385/104 |
| 6,714,708 B2 * | 3/2004 | McAlpine et al. | ............. | 385/110 |
| 7,530,372 B2 * | 5/2009 | Gerez et al. | ..................... | 138/134 |
| 7,848,604 B2 * | 12/2010 | Reed et al. | ..................... | 385/100 |
| 2005/0034443 A1* | 2/2005 | Cook | ............................... | 57/236 |
| 2009/0226177 A1* | 9/2009 | Woosnam | ...................... | 398/115 |

OTHER PUBLICATIONS

"Power Systems: Submarine Power Cables, Design, Installation, Repair, Environmental Aspects", Chapter 2 "Submarine power cables and their design elements"; by Worzyk, Springer-Verlag, Berlin, 2009.*

* cited by examiner

*Primary Examiner* — Ryan Lepisto
*Assistant Examiner* — Robert Tavlykaev
(74) *Attorney, Agent, or Firm* — Sofer & Haroun, LLP

(57) ABSTRACT

A fiber optic cable is provided having a at least one fiber element, a layer of aramid strength members, and a jacket disposed over said layer of aramid strength members. The layer of aramid strength members is wound at a lay length that is equal to or lesser than a predetermined bend radius.

11 Claims, 14 Drawing Sheets

FIBER OPTIC CABLE FOR CORDAGE OR TACTICAL APPLICATIONS

BACKGROUND

1. Field of the Invention

The present arrangement relates to fiber optic cables. More particularly, the present arrangement relates to a fiber optic cable with a modified construction for cordage or tactical applications.

2. Description of the Related Art

Cordage and tactical applications for fiber optic cables are typically required to meet very stringent testing requirements, such as being able to operate under extreme temperatures, have good tensile strength, higher resistance to abrasion and crushing, etc. However, at the same time tactical fiber optic cables also need to maintain a certain level of flexibility, so as to be wound and unwound from relatively small drums for fast and easy field deployment.

For example, a typical tactical fiber optic cable may be constructed as a tight buffer optical fiber(s), surrounded by longitudinal or slightly stranded aramid fibers and enclosed within an outer jacket of polyurethane. The tight buffer optical fiber is generally a more protected fiber than normal UV optical fibers. The aramid fibers provide strength to the cable, such as tensile strength, and the polyurethane jacket provides a tough but flexible outer casing that can endure severe temperatures. See prior art FIG. 1.

However, such a cable, although flexible, still has certain drawbacks associated with its ability to wind and unwind around tight cable drums, such as for application requiring highly portable fiber drums. Because of the properties of the polyurethane under partial pressure extrusion, including its melt-flow properties (and which has no measured shrinkage after the jacket is removed an exposed to 110° C. for 2 hrs), the jacket minutely encapsulates some of the layer of aramid fibers/strength members causing the outer portion of the strength layer to "weld" into the inside diameter of the polyurethane jacket as shown for example in prior art FIG. 2. In other words, the aramid and jacket combination, at least in part forms an aramid reinforced polymer at their interface.

This welding of the strength layer to the inside of the jacket partially fuses the two layers, reducing flexibility, particularly when the cable is turned around a non-standard tight or reduced diameter drum, tent post, or mandrel during testing. In an ideal non-welded situation the surface of the jacket (particularly at the inside portion of the tightest bending) is able to stretch and the aramid fibers therein may re-position so that the jacket and strength fibers do not transfer the bending stresses down/up onto the fibers therein. However, as illustrated in prior art FIG. 3, when the aramid fibers are welded into the jacket as shown in FIG. 2 above, and when the cable is bent around a drum or mandrel, the shorter path (inner surface of the jacket against the drum) must absorb all of the shortening since aramid-welded polymer cannot stretch. This results in the inner radius jacket having to collapse on itself in an accordion fashion and the inner uncoupled constituents of strength yarn filaments or aramid fibers, optical fibers, tight buffered optical fibers, subunits or fillers being forced to adapt or collapsed to a reduced longitudinal space or to be longitudinally "crushed" into a sine-wave shape. Additionally, the strength yarn filaments or fibers welded in along the top surface of the bend (away from the drum or mandrel) cannot reposition and are pulled down on the upper surface of the fiber in the middle of the cable. The distorted jacket and welded aramid fiber combination pushes in towards the strength filaments or fibers, optical fibers, tight buffered optical fibers, subunits or fillers in the center causing either unacceptable levels of attenuation of even outright failure of the cable.

In an exemplary calculation using a tactical cable with an outer diameter (OD) of 0.310" being wrapped around a 3" mandrel the following equation shows the approximate crushing percentage (length differential caused by bending around the mandrel) that must be entirely absorbed on the inner diameter of the bent cable when the welded aramid jacket cannot reposition or stretch along the outer diameter.

$$\pi(3+0.310) \cdot \pi(3)/\pi(3) = 0.310/3 = 0.1033 = 10.33\%$$

$$[(\pi*\text{diameter of outside bend}) \cdot (\pi*\text{diameter of inside bend})/(\pi*\text{mandrel diameter})]$$

Using the same size OD cable 0.310 around a 2" mandrel $$\pi(2+0.310) \cdot \pi(2)/\pi(2) = 0.310/2 = 0.155 = 15.5\%$$

Likewise, in an exemplary calculation using a tactical cable with an outer diameter (OD) of 0.175" being wrapped around a 2.5" mandrel the following equation shows the approximate crushing percentage that must be entirely absorbed on the inner diameter of the bent cable when the welded aramid jacket cannot reposition or stretch along the outer diameter.

$$\pi(2.5+0.175") \cdot \pi(2.5)/\pi(2.5) = 0.175/2.5 = 0.07 = 7\%$$

Using the same site OD cable 0.175 around a 2" mandrel $$\pi(2+0.175) \cdot \pi(2)/\pi(2) = 0.175/2 = 0.0875 = 8.75\%$$

Using the same size OD cable 0.175 around a 1" mandrel $$\pi(1+0.175) \cdot \pi(1)/\pi(1) = 0.175/1 = 0.175 = 17.5\%$$

As such, in a cable according to the prior art, with the aramid strength fibers welded into the jacket, and with the outer surface of the jacket on the bend unable to stretch, the two surfaces share the amount that must be absorbed by the bend, the inner surface of the bend must absorb roughly 50% of the approximated 10%-15% length differential (or 5% to 7.5%) as shown in FIG. 3.

OBJECTS AND SUMMARY

The present invention overcomes these drawbacks by altering the design of the aramids and jacket so as to minimize this "welding in" effect or otherwise preventing it all together so that when tactical or cordage application tight buffer optical fiber cables are bent around relatively smaller drums or mandrels, the aramid fibers and jacket do not crush into the optical fiber therein.

To this end, the present arrangement includes a fiber optic cable having a at least one fiber element, a layer of aramid's strength members, and a jacket disposed over said layer of aramid strength members. The layer of aramid strength members is wound at a lay length that is equal to or lesser than a predetermined bend radius.

Alternatively, the present arrangement includes a fiber optic cable having at least one fiber element, a layer of aramid strength members, an aramid coating layer, and a jacket disposed over the layer of aramid strength members, where the aramid coiling layer is non-slip with respect to the jacket.

BRIEF DESCRIPTION OF THE DRAWINGS

The present invention can be best understood through the following description and accompanying drawings, wherein.

DETAILED DESCRIPTION

Figure 4:
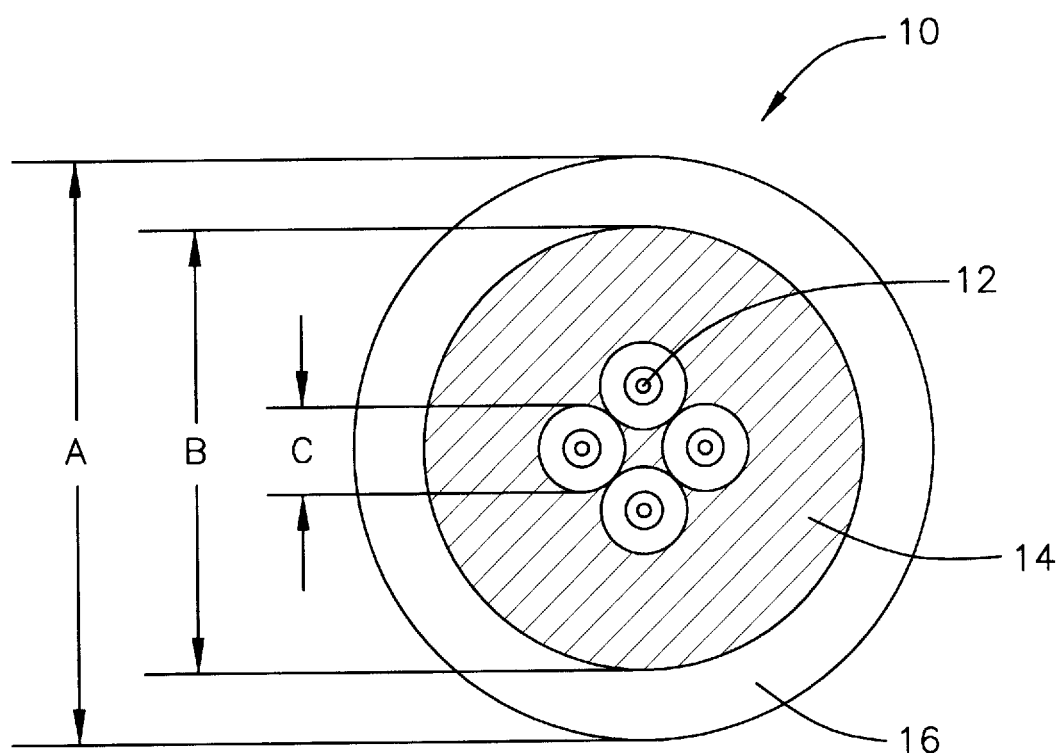
FIG. 4 shows a cut away view of a tactical fiber optic cable according to one embodiment.

In one arrangement, as shown in FIG. 4 a tactical or cordage application fiber optic cable 10 includes four tight buffer optical fibers 12 a plurality of helically wound aramid yarns 14 around optical fiber 12 and a jacket 16 over aramid yarns 14.

Figure 5:
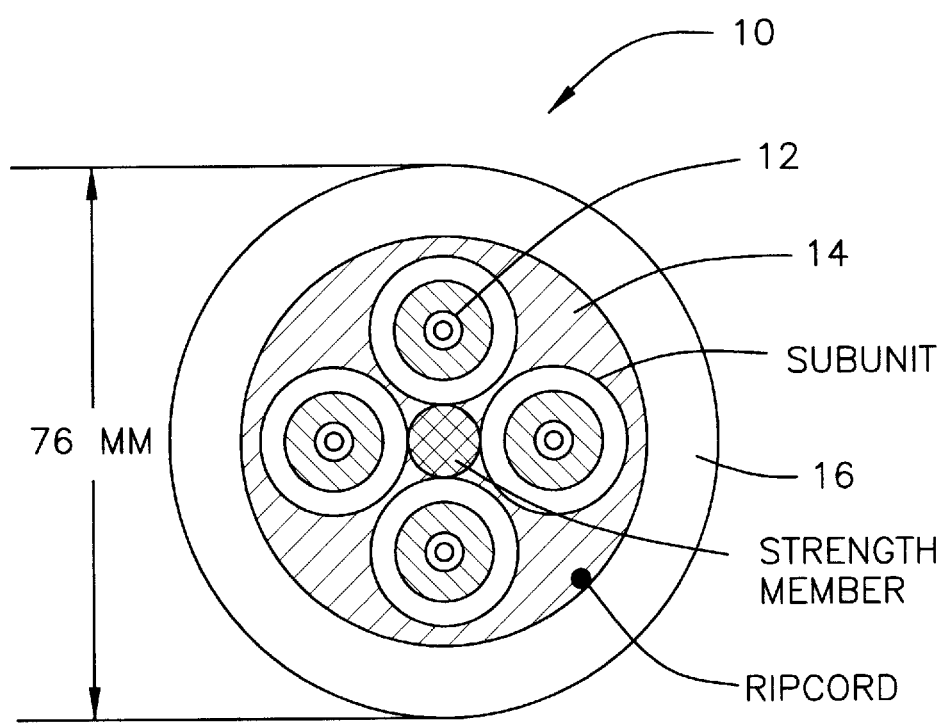
FIG. 5 shows a cut away view of a tactical fiber optic cable according to an alternative embodiment.

For the purposes of illustration, the present arrangement will be described with four tight buffer optical fibers 12. However, the invention is not limited in his respect The features of the invention may be implemented with other signal carrying fibers such as a single tight buffer fiber, grouped (jacketed) fiber subunits, UV coated optical fibers within a loose tube arrangement and the like. For example, FIG. 5 shows an alternative arrangement with cable 12 having multiple fiber sub-units (fibers within independent breakout jackets independent of cable jacket 10).

For the purposes of illustration, the present arrangement will be described as advantageously employing a polyurethane jacket 16, such as a TPU (Thermoplastic Polyurethane) Estane 58202 TPU polyether-type TPU. However, the invention is not limited in this respect. The features of the invention may be implemented with other polymers used for jacket 16 including any polymers that, as per their melt characteristics would exhibit a strong welding to the underlying aramid fibers.

Turning to aramid yarns 14, these are the primary strength member of cable 10 that provide it with its tensile strength and other physical strength characteristics. In the present arrangement, aramid yarns 14 are described as 15-24 yarns of 1500 denier aramid fibers. However, the invention is not limited in this respect. Depending on the size of the aramids, more or less yarns or differing sizes could be used within the context of this invention. Moreover, although aramid yarns 14 are typically used in tactical or cordage fiber optic cable applications, the invention also contemplates the use of other strength elements, either along with aramids 14 or in place of them.

It is noted that the aramid fibers that make up aramid yarns 14 are typically available in different forms including with a coating at 0.3, 0.7 or 1.3% (by weight) or even generous water swellable power coverage (at up to 10% by weight or greater). In one arrangement, the present cable 10 exhibits a high degree of welding between aramids 14 and jacket 16 by using the lesser coated 0.3% finish. The low coating or water swellable aramids fibers of aramid yarns 14 results in a high level of jacket 16 adhesion. It is understood that using aramid fibers with heavier de-adhesive coating (such as with silicon oil or paraffin oil) within aramid yarns 14 may have a reduced weld with jacket 16, but the features of the present invention may be equally applied using such fibers for aramid yarns 14.

Another characteristic of the fibers of aramid yarns 14 is the twist rate of the fibers within yarn 14. A minimal twist of the fibers that form aramid yarns 14 render those fibers practically parallel to one another, and thus free and somewhat individual. This results in the plastic of jacket 16, during extrusion, flowing around the circumference of the fibers of aramid yarns 14, particularly adjacent to the plastic flow as jacket 16 is being applied.

It is noted that the low twist of individual fibers forming aramid yarns 11 refers to the twist rate of the individual aramid fibers within the aramid strength members/yarn 14 and not to the rate of helical application of the yarns 14 themselves around the other components within cable 10 (ie. fibers 12). Strength members/yarns 14 are actually twisted at a high rate/short lay length within cable 10 as discussed in more detail below.

Figure 6:
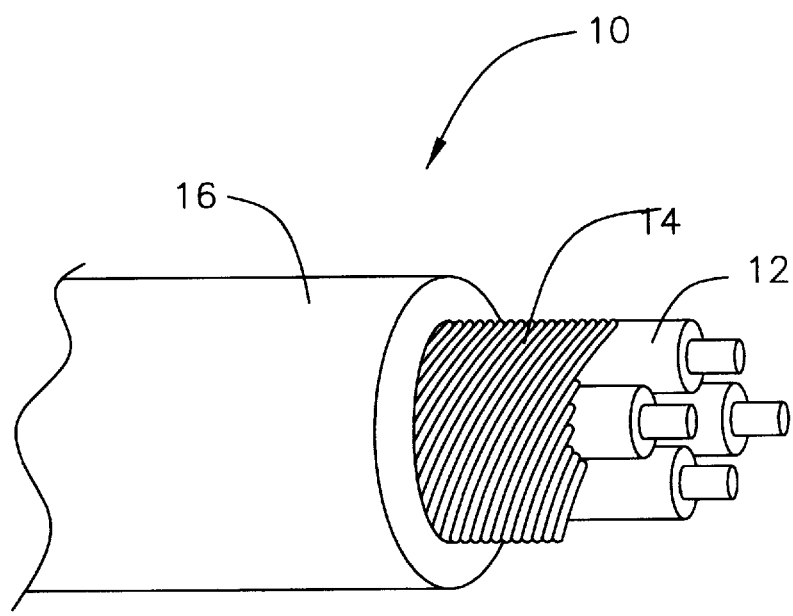
FIG. 6 shows a profile view of the tactical fiber optic cable of FIG. 4 in a side cut-away view.
Figure 7:
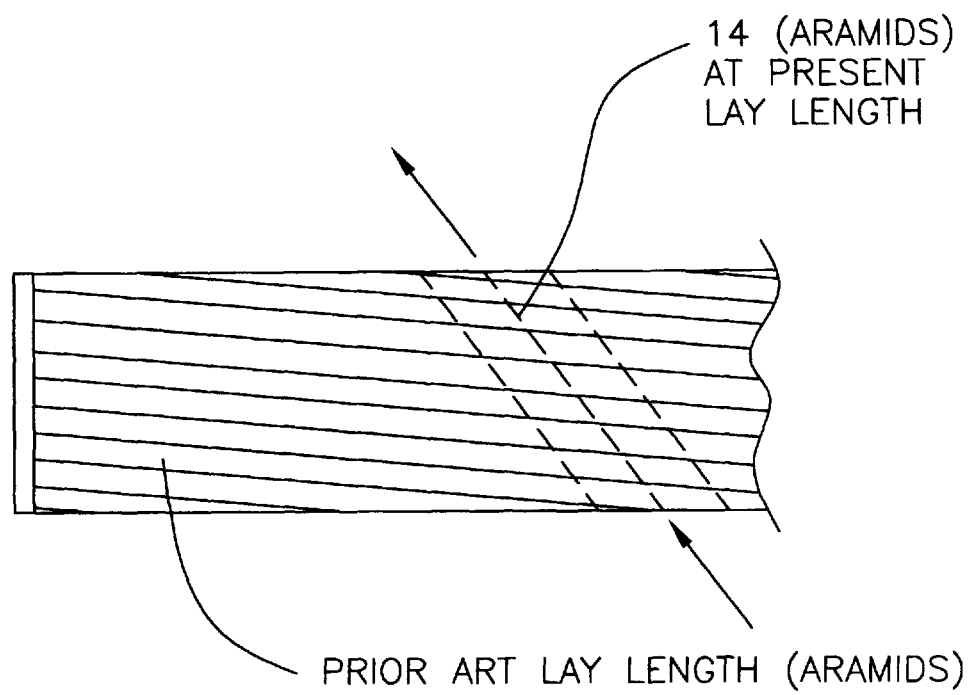
FIG. 7 shows a profile view of the present aramid fibers in the strength portion of a tactical fiber optic cable in overlay over a prior art longer lay length.

Turning to the arrangement of aramid yarns 14 within cable 10 in a first arrangement as shown in FIG. 6, for an exemplary cable 10 having an OD of 0.310, aramid strength yarns 14 are helically applied in a lay length of approximately 2.5"-3" as opposed to a more typical lay length of 5"-8". FIG. 7 shows a comparison of a typical prior art aramid lay length versus the present 2.5"-3.0" tighter lay lengths. As will be discussed below in more detail the actual lay length used for aramid yarns 14 are changed based on the desired flexibility/bending requirements. The present example of 2.5"-3.0" lay length for aramid yarns 14 is for a desired bending of 3" mandrel/drum for a 0.310" OD cable 10.

This arrangement of the tighter lay length for aramid yarns 14 provides a significant advantage over prior art tactical cables, particularly with its ability to withstand tighter bend radiuses without incurring the problems described above in the background sections.

For example, normally a cable according to the prior art designs would be expected to meet a potential bend radius (or bend radius testing) around a mandrel or drum that is roughly 20 times its OD. In other words using the 0.310" OD tactical cable as described in the present example, in the prior art design, the cable may be expected to meet a bend radius testing around qua approximately 6" diameter testing mandrel. However, with ever increasing demands for tighter bending, a cable with an OD 010.310" may be required to meet a 10× its OD (or 3") bending test radius which is half the diameter that was previously expected.

In cable 10 of the present arrangement, by shortening the lay length of aramid yarns 14 to no greater than 10 times the OD of cable 10 (ie. 3" lay length for a 0.310" OD), cable 10 can pass the necessary bend radius testing with an acceptable attenuation on bending around a mandrel of 10 times the OD of cable 10. In other words, for a g yen OD of cable the lay length of the aramid yarns 14 should be set no greater than the minimum desired bend radius.

Figure 3:
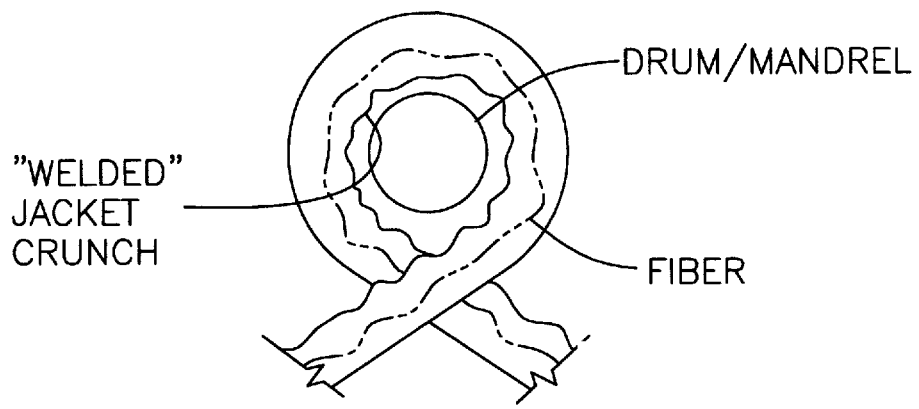
FIG. 3 shows the prior art cable of FIGS. 1 and 2 bent around a mandrel and exhibiting the results of the welded aramid/jacket combination.

Thus, according to the present arrangement as shown in FIGS. 6 and 7, by wrapping the aramid with either the same lay length or a lesser lay length (such as 2.5"-3.0" in the present example) than the target diameter of the mandrel in the bend testing (which in most specifications is set by the OD of the cable), the aramid attached to the jacket would act more like a spring and not contract the jacket along its inner surface (as opposed to prior art FIG. 3).

Figure 16:
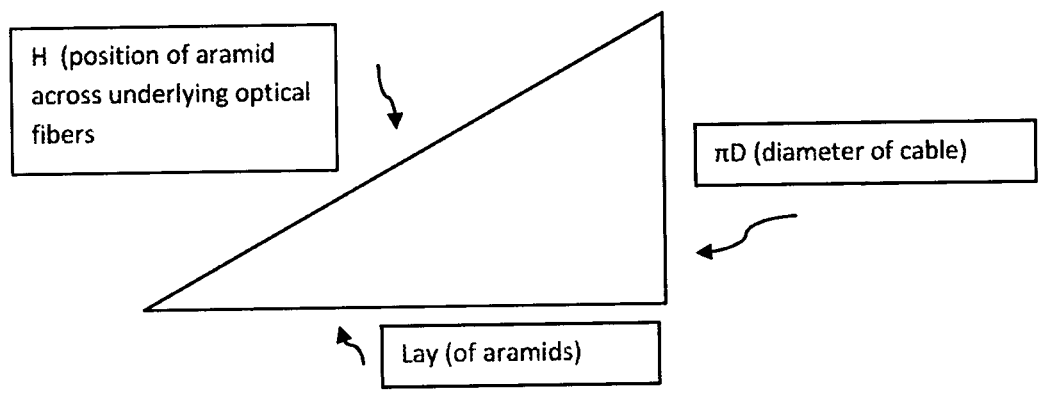
FIG. 16 is an triangle and equation for certain examples shown in FIG. 7 in accordance with one embodiment.

This arrangement results in a broader angle for the fibers relative to the longitudinal direction of fiber and jacket. For example using the examples above in FIG. 7, with a cable having 0.310" OD the angle of aramid yarns 14 relative to the longitudinal direction of cable 10 is denoted by the triangle and equations shown in FIG. 16

As noted above, FIG. 7 shows the present shorter lay length of aramid yarns 14 disposed over top of exemplary aramid yarns in prior art designs having longer lay lengths. Using this triangular representation of aramid yarns 14 laid across the components of cable 10, the angle θ represents that angle relative to the longitudinal direction of the cable (and its component jacket 16 and fibers 12). This angle θ is larger in the present arrangement than prior art as it directly corresponds to the shorter lay length.

For example, using an example of a 2.5" lay length for aramids 14 in a 0.310" OD cable 10

$$\tan \theta = (\text{opposite side/adjacent side}) \text{ or } \tan \theta = 0.310"\pi(0.9738")/2.5"$$

$$\theta = \text{about } 21.202° \text{ angle relative to the longitudinal axis of the cable}$$

on the other hand—using a 5" lay length as in the prior art results in $$\tan \theta = \text{opp/adj or } \tan \theta = 0.310"\pi(0.9738")/5.0"$$

$$\theta = \text{about } 11.021° \text{ angle relative to the longitudinal axis of the cable}$$

Figure 8:
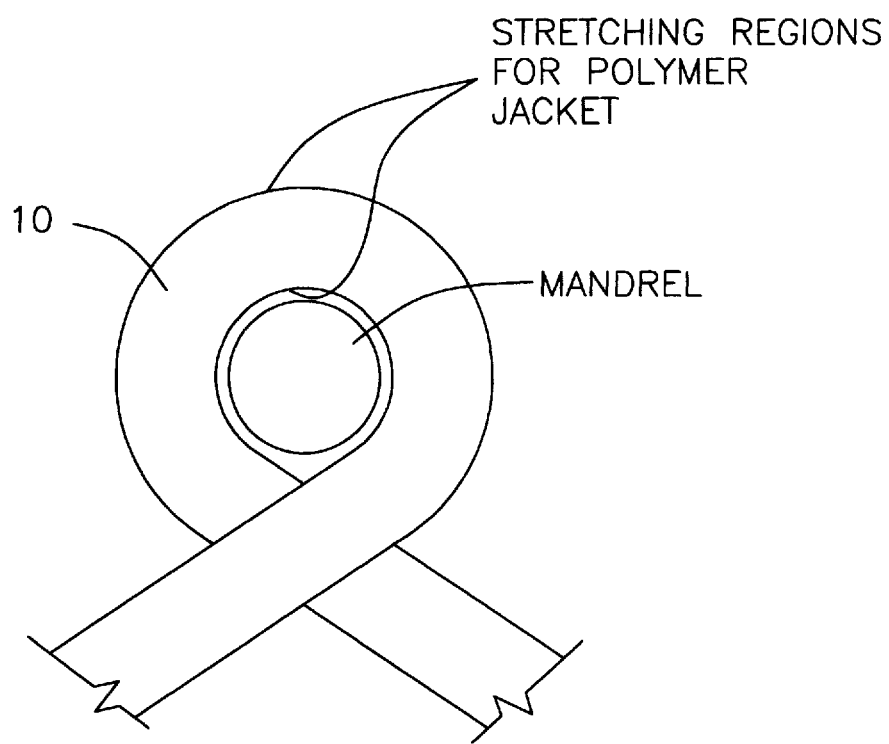
FIG. 8 shows a side view of the cable of FIGS. 4 and 6 being pulled around a 3" mandrel according to one embodiment.
Figure 9:
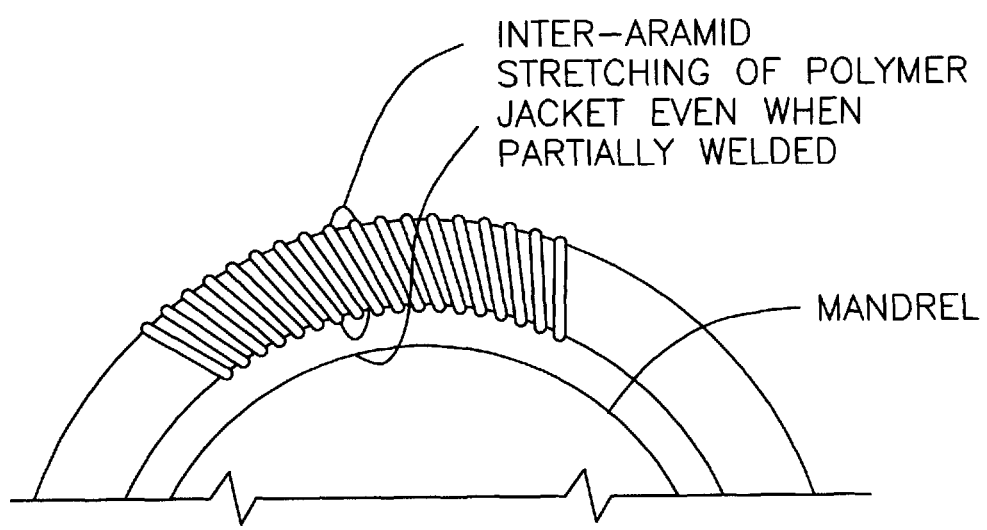
FIG. 9 shows a close up diagram the inter fiber stretching of the polymer of jacket occurring in FIG. 8 according to one embodiment.

Because aramid yarns 14 in the present arrangement are at a greater angle relative to the longitudinal direction of the jacket/optical fibers/cable, when cable 10 is pulled around a mandrel, even with the welding effect between jacket 16 and aramid yarns 14, the polymer of jacket 16 prevents the bunching up, shown in prior art FIG. 3. The shorter lay of aramid yarns 14 renders the aramid 11 direction more perpendicular to the direction of stretch in jacket 16, allowing the stretch between the filaments/fibers of aramid yarns 14. This arrangement avoids the resultant attenuation seen in the prior art. See for example, FIG. 8 showing they present arrangement cable 10 being pulled around a 3" mandrel and FIG. 9 showing a diagram of the inter-fiber stretching of the polymer of jacket 16.

Such an arrangement, even with the welding effect, produces cables 10 that meet the acceptable attenuation standards while still maintaining high pull off strength (eg. 90 lbs pull off). For example, an exemplary proposed military specification (mil spec MIL-PRF-84045/8B) requires that the long term minimum bend diameter be substantially 10 times the cable OD. The present arrangement, with various arrangements of internal fiber optic components, is able to meet this standard in contrast to prior art cables with longer lay lengths for their aramid yarns which typically can only allow for a minimum bend radius of 20 times the OD of the cable using the same polyurethane jacket and aramid yarns.

Owing to the affect produced above a general rule is developed that in order to ensure that cable 10 meets the required bend radius test, it is desirable to have the lay length of aramid yarns 14 to be within the range of 75%-100% (but not greater) than the diameter of the test radius. It is noted that typically the desired bend radius capability is set based on a multiple (eg. 10×) the OD of the cable.

For example

| Desired radius | lay length of aramids |
|---|---|
| 4" | 3"-4" |
| 3" | 2.25"-3" |
| 2" | 1.5"-2" |

Although in theory even shorter lay lengths for aramid yarns 14 may be used, they are less desirable because of the resultant low line speeds they would cause.

Optical fiber cable 10 for cordage or tactical configurations made according to the above description do not overly attenuate when wrapped 10-100 times around the target mandrel. The present arrangement, while being flexible, likewise continues to meet other typical tactical and cordage ruggedness standards such as being able to withstand 2000 repetitions are a multiple pass sheave machine after −60° C. temperatures (ie. remains flexible for tight bending, while still being of rugged design.)

For example employing the design outlined above, using standard optical fibers for fiber 12, the present cable 10 meets the following attenuation standards
 0.175" cable OD having 2.5" aramid 14 lay—
 10 turns around a 2.5" mandrel resulted in only 0.2 dB attenuation@1550 nm
 0.301" cable OD having 2.8" aramid 14 lay—
 30 turns around a 3" mandrel resulted in only 0.12 dB attenuation@1550 nm
 0.301" cable OD having 2.8" aramid 14 lay
 50 turns around a 2" mandrel resulted in only 0.91 dB attenuation@1550 nm It is noted that the above discussed crushing caused by the welded jacket 16 and aramid yarns 14 may result in a protrusion of the internal constituents of optical cables (eg. fibers, subunits, yarns and fillers . . . ), when for a typical test condition, a 1 meter sample is wrapped around a test mandrel. For example, for a given radius test mandrel, the components of a typical prior fiber cable may protrude ⅜" to 1" after wrapping. On the other hand, a cable 10 according to the present arrangement with a high rate of twist/short lay length for aramid yarns 14, experiencing no crushing effect and thus a lesser amount of cable component protrusion results, typically in the range of 0 to ¼" under the same 1 meter test conditions. This provides another indicator of the effective compression of the jacket relative to the prior art.

Figure 10:
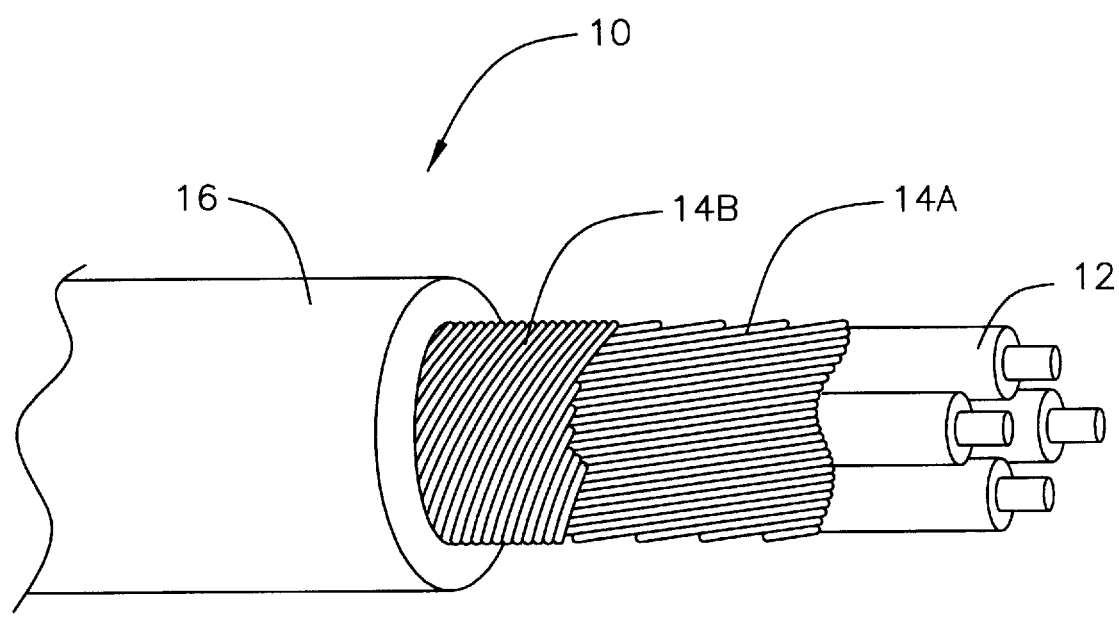
FIG. 10 shows an alternative arrangement of the cable of FIGS. 4 and 6 using a two layer aramid layer in accordance with one embodiment.

In another embodiment, as shown in FIG. 10, it was found that the key aramid strands 14, are the ones next to jacket 16. These outer yarns 14 are the ones among the plurality of yarns 14 that stuck or are welded to jacket 16 during extrusion. Therefore, these outer aramid yarns 14 closer to jacket 16 are the ones that are wrapped over the tight buffers at the desired shorter lay lengths (set by the desired target radius).

For example, as shown in FIG. 10, aramid yarns 14 is divided into inner aramid layer 14a and outer aramid layer 14b. Inner aramid layer 14a need only be helically wound at the normal 5"-8" lay length. However, outer aramid layer 14b should be wrapped at the tighter lay length that is between 75% and 100% of the diameter of the target bend radius as described above. Because the welding of jacket 16 to aramids occurs primarily the outer layers it is possible that outer aramid layer 14b (of tighter lay length) need only be made from 4-8 yarns from the total 15-25 yarns, with the remaining yarns being in inner aramid layer 14a.

Figure 1:
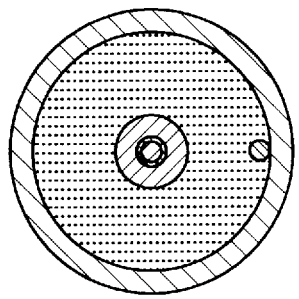
FIG. 1 shows a prior art tactile or cordage application fiber optic cable.
Figure 2:
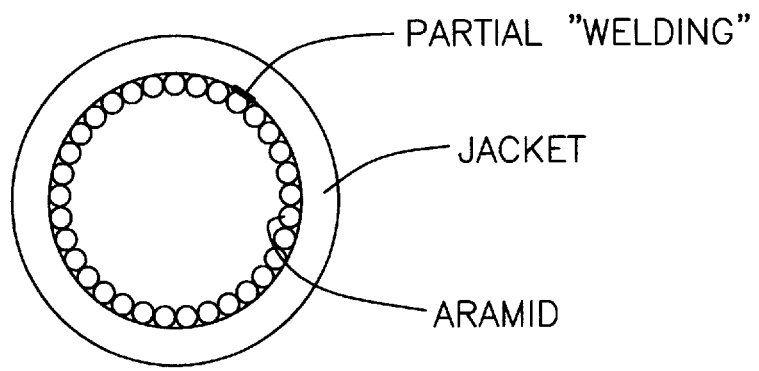
FIG. 2 shows a prior art tactile or cordage application fiber optic cable of FIG. 1 with the aramid strength cables welded into the jacket.
Figure 11:
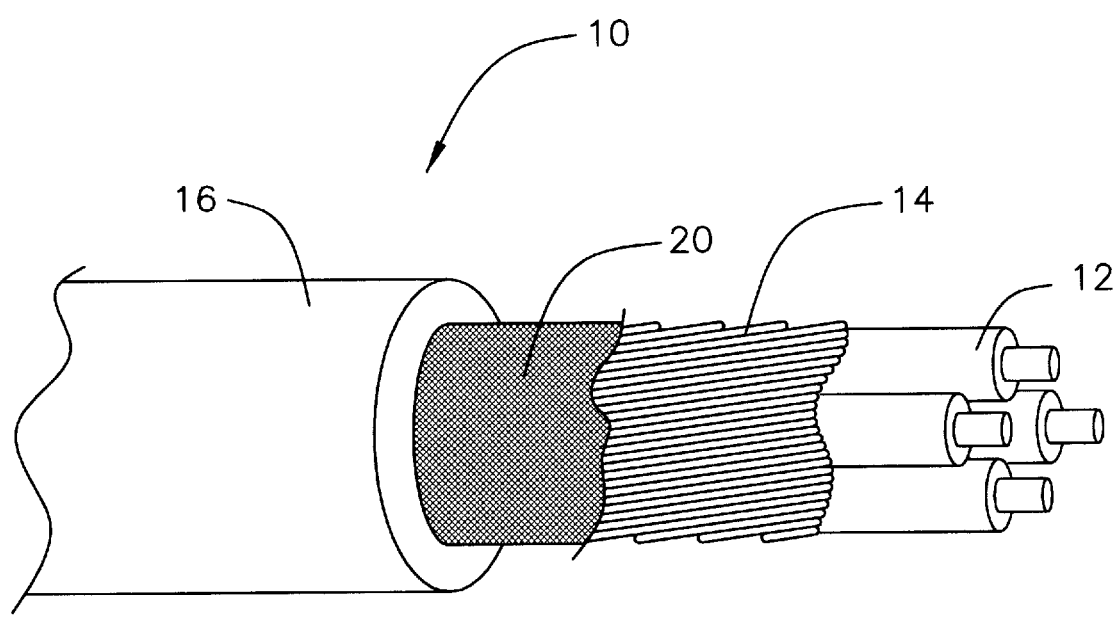
FIG. 11 shows an alternative arrangement of the cable of FIGS. 4 and 6 using a barrier layer of talc or powder.

In another embodiment shown in FIG. 11, instead of reducing the lay length of aramid strength fiber layer 14, a harrier layer 20 is introduced between jacket 16 and aramid layer 14. For example, layer 20 is formed during the cabling/extrusion process as a relatively large amount of release powder or release agent placed on top of aramid 14 to prevent adhesion or "welding" with jacket 16. This eliminates the high modulus yarn's adhesion to jacket 16 and thus avoids the bunching issue shown in prior art FIGS. 2 and 3. Layer 20 is formed as a powder of high volume completely covering aramid 14 using a talc water swellable powder or a of a mix of the two where the powder is applied with a 100-500 micron thickness over aramid 14 to prevent adhesion to jacket 16.

Figure 12:
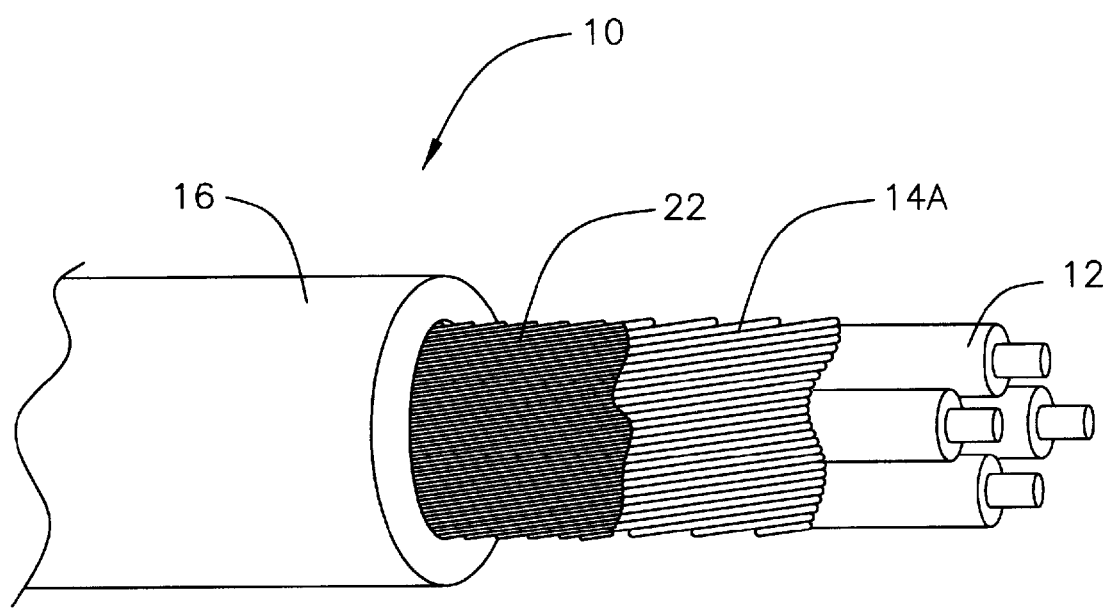
FIG. 12 shows an alternative arrangement of the cable of FIGS. 4 and 6 using a two layer strength arrangement with both an aramid layer and a flexible layer in accordance with one embodiment.

In another embodiment shown in FIG. 12 instead of using a two layer 14a and 14b aramid section as shown in FIG. 10, the outer layer 14b is replaced with a different form to strength yarn 22. For example, in one exemplary arrangement, strength layer 22 is made from strength fibers of polyester or other low modulus yarns. Such polyester or low modulus yarns 22 allow the highly adhesive polyurethane jacket 16 to bond with a stretchable yarn rather than the less flexible aramid yarns of layer 14a. Thus jacket 16 does not weld or Contact the aramid yarns of 14a eliminating the high modulus yarn adhesion to jacket 16 preventing the contraction occurrence as shown in prior art FIG. 3. This arrangement, with low modulus yarn layer 22, uses the higher than normal lay lengths so as to use higher cable 10 production line speeds.

Figure 13:
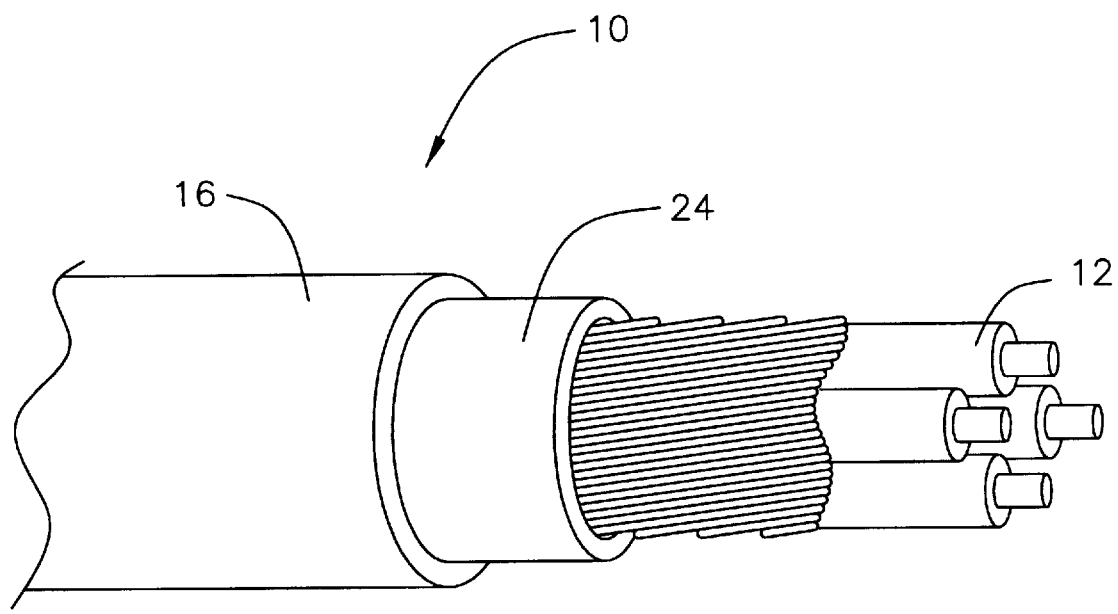
FIG. 13 shows an alternative arrangement of the cable of FIGS. 4 and 6 using a barrier layer of polymer between the jacket and the aramid layer in accordance with one embodiment.

In another embodiment shown in FIG. 13 instead of reducing the lay length of aramid strength fiber layer 14, a polymer barrier layer 24 is introduced between jacket 16 and aramid layer 14. For example, layer 24 is formed during the jacket 16 extrusion process, possibly by double extrusion, using PVC (polyvinyl chloride), PE (polyethylene) or PP (polypropylene). This polymer harrier layer 24 is made from a non-adhesive polymer (meaning its properties do not result in welding to the aramid yarns during extrusion) allows aramids 14 to move or re-distribute and allows the outer polyurethane jacket 16 to flex during bending.

Figure 14:
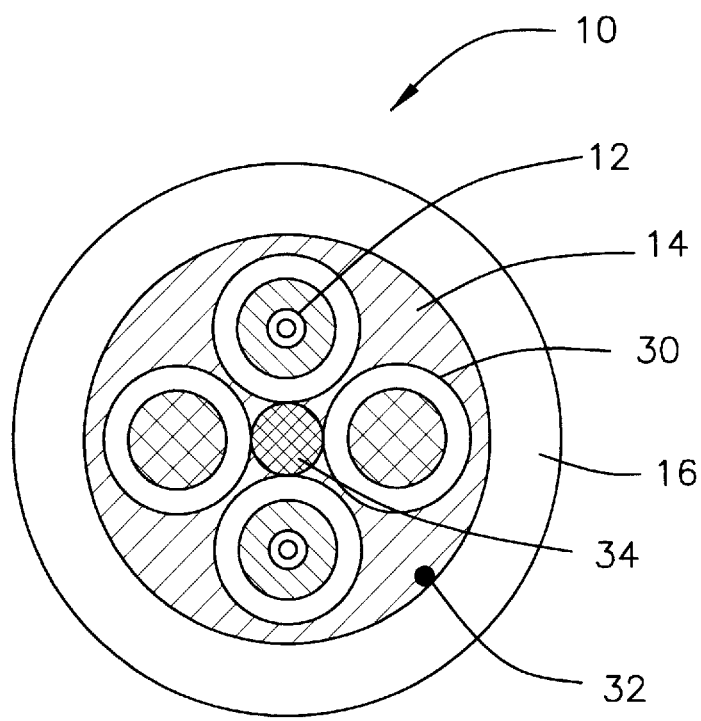
FIG. 14 shows an alternative arrangement of the cable of FIGS. 4 and 6 using copper wires in addition to the fiber elements in accordance with one embodiment.
Figure 15:
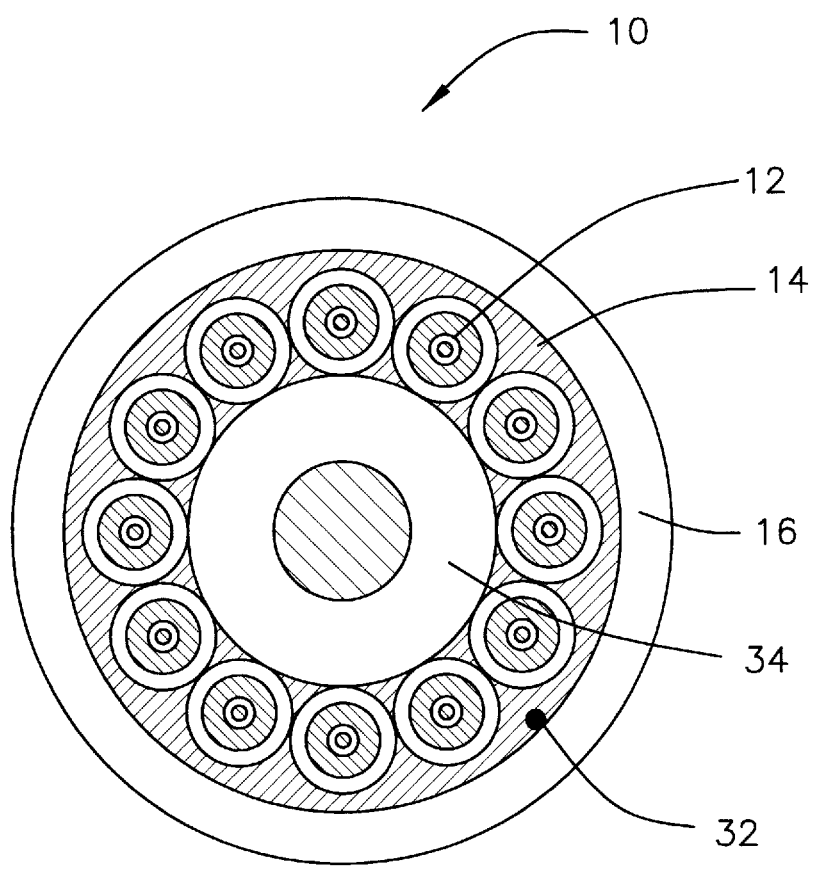
FIG. 15 shows an alternative arrangement of a high fiber count cable in accordance with one embodiment.

In another arrangement, as shown in FIGS. 14 and 15, cable 10 includes additional features typical of tactile cables. For example, in addition to the components discussed above, FIG. 14 shows a cable 10 with tight buffer fiber optic elements 12, aramid fibers 14 and jacket 16. However, cable 10 additionally has copper wires 30 for power transmission within the cable as well as a ripcord 32 for assisting in removing jacket 16. Additionally a central/dielectric strength member 31, such as a GRP (Glass reinforced polymer) or other such central member may be included. In any event, aramid fibers 14 are helically wound around these cable 10 components at a short lay length, at or below the target bend radius. FIG. 15 shows another exemplary high fiber count cable 10 with (12) tight buffer fiber units 12 around a central strength member 34. Again, aramid fibers 14 are helically wound around these cable 10 components at a short lay length, at or below the target bend radius.

While only certain features of the invention have been illustrated and described herein, many modifications, substitutions, changes or equivalents will now occur to those skilled in the art. It is therefore, to be understood that this application is intended to cover all such modifications and changes that fall within the true spirit of the invention.

What is claimed is:

1. A fiber optic cable for tactical applications comprising:
   at least one optical fiber element;
   a layer of aramid strength members; and
   a jacket disposed over said layer of aramid strength members and at least partially coupling with said aramid strength members,
   wherein said cable is configured to meet an attenuation level,
   wherein said cable is required to meet a first predetermined minimum bend radius,
   wherein said layer of aramid strength members is wound at a lay length equal to or lesser than said first predetermined minimum bend radius of said cable, so that said layer of aramid strength members, that are at least partially coupled with said jacket disposed thereover, are substantially fixed at a sufficient angle to a longitudinal direction of said optical fiber elements such that said partially coupled aramid strength members do not crush into said at least one optical fiber element during bending, and
   wherein said layer of aramid strength members is wound at a lay length that is substantially in the range of 0.75 to 1 times the first predetermined minimum bend radius so that a bend radius of said cable is substantially twice said first predetermined minimum bend radius while simultaneously meeting said attenuation level.

2. The fiber optic cable as claimed in claim 1, further comprising a plurality of fiber elements, said elements in the form of tight buffer optical fibers.

3. The fiber optic cable as claimed in claim 2, wherein said plurality of fiber elements in the form of tight buffer optical fibers are contained within separate subunits from one another within said jacket.

4. The fiber optic cable as claimed in claim 1, wherein said jacket is made from polyurethane.

5. The fiber optic cable as claimed in claim 4, wherein said jacket is at least partially welded into said aramid strength members.

6. The fiber optic cable as claimed in claim 5, where the fibers that make up said aramid strength members are low twist.

7. The fiber optic cable as claimed in claim 5, where the fibers that make up said aramid strength members are coated with 0.3% coating.

8. The fiber optic cable as claimed in claim 5, where the fibers that make up said aramid strength members are covered in water swellable powder.

9. The fiber optic cable as claimed in claim 1, wherein said first predetermined minimum bend radius is substantially 10 times the outside diameter of said cable.

10. The fiber optic cable as claimed in claim 1, wherein said first predetermined minimum bend radius is defined by a test parameter requiring multiple windings around a drum or mandrel having a diameter substantially equal to said predetermined bend radius.

11. A fiber optic cable for tactical applications comprising:
    at least one optical fiber element;
    a first inner layer of aramid strength members;
    a second outer layer of aramid strength members; and a jacket disposed over said layer of aramid strength members and at least partially coupling with said aramid strength members, wherein said cable is configured to meet an attenuation level, wherein said cable is required to meet a first predetermined minimum bend radius, wherein said second outer layer of aramid strength members is wound at a lay length equal to or lesser than said first minimum predetermined bend radius of said cable so that said layers of aramid strength members, that are at least partially coupled with said jacket disposed thereover, are substantially fixed at a sufficient angle perpendicular to a longitudinal direction of said optical fiber elements such that said partially coupled aramid strength members do not crush into said at least one optical fiber element during bending, and wherein said second outer layer of aramid strength members is wound at a lay length is substantially in the range of 0.75 to 1 times the first predetermined bend radius so that a bend radius of said cable is substantially twice said first predetermined bend radius while simultaneously meeting said attenuation level.

* * * * *